(12) United States Patent
Martinez

(10) Patent No.: US 9,558,354 B2
(45) Date of Patent: Jan. 31, 2017

(54) METHOD FOR GENERATING AND EXECUTING ENCRYPTED BIOS FIRMWARE AND SYSTEM THEREFOR

(71) Applicant: Dell Products, LP, Round Rock, TX (US)

(72) Inventor: Ricardo L. Martinez, Leander, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 131 days.

(21) Appl. No.: 14/551,745

(22) Filed: Nov. 24, 2014

(65) Prior Publication Data
US 2016/0147996 A1    May 26, 2016

(51) Int. Cl.
G06F 9/24 (2006.01)
G06F 15/177 (2006.01)
G06F 21/57 (2013.01)
G06F 9/44 (2006.01)
H04L 9/08 (2006.01)
G06F 21/60 (2013.01)
G06F 21/78 (2013.01)

(52) U.S. Cl.
CPC ......... G06F 21/572 (2013.01); G06F 9/4401 (2013.01); H04L 9/0877 (2013.01); H04L 9/0897 (2013.01); G06F 21/575 (2013.01); G06F 21/60 (2013.01); G06F 21/78 (2013.01); H04L 2209/24 (2013.01); H04L 2209/34 (2013.01); H04L 2209/605 (2013.01)

(58) Field of Classification Search
CPC ...... G06F 21/572; G06F 21/575; G06F 21/60; G06F 21/178; H04L 2209/605; H04L 2209/34; H04L 2209/24; H04L 9/16; H04L 9/3234
USPC ................................................. 713/1, 2, 100
See application file for complete search history.

(56) References Cited

U.S. PATENT DOCUMENTS

| 5,859,911 | A | 1/1999 | Angelo et al. | |
|---|---|---|---|---|
| 8,019,994 | B2 | 9/2011 | Rios et al. | |
| 8,554,176 | B2 * | 10/2013 | McLean | G06F 21/602 455/410 |
| 2002/0169976 | A1 | 11/2002 | Schelling et al. | |
| 2005/0111664 | A1 | 5/2005 | Ritz et al. | |
| 2009/0013166 | A1 | 1/2009 | Crowder, Jr. et al. | |
| 2009/0292919 | A1 * | 11/2009 | England | H04L 9/0897 713/168 |
| 2012/0096104 | A1 * | 4/2012 | Hironaka | H04N 21/4424 709/212 |
| 2014/0082373 | A1 * | 3/2014 | Colnot | G06F 21/572 713/193 |

* cited by examiner

Primary Examiner — Michael J Brown
(74) Attorney, Agent, or Firm — Larson Newman, LLP

(57) ABSTRACT

A firmware image is received at an information handling system. A symmetric key is generated and stored at a trusted platform module (TPM). The firmware image is encrypted using the symmetric key. The encrypted firmware image is stored in a non-volatile memory.

20 Claims, 3 Drawing Sheets

METHOD FOR GENERATING AND EXECUTING ENCRYPTED BIOS FIRMWARE AND SYSTEM THEREFOR

FIELD OF THE DISCLOSURE

This disclosure generally relates to information handling systems, and more particularly relates to generating and executing encrypted BIOS firmware at an information handling system.

BACKGROUND

As the value and use of information continues to increase, individuals and businesses seek additional ways to process and store information. One option available to users is information handling systems. An information handling system generally processes, compiles, stores, and/or communicates information or data tier business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
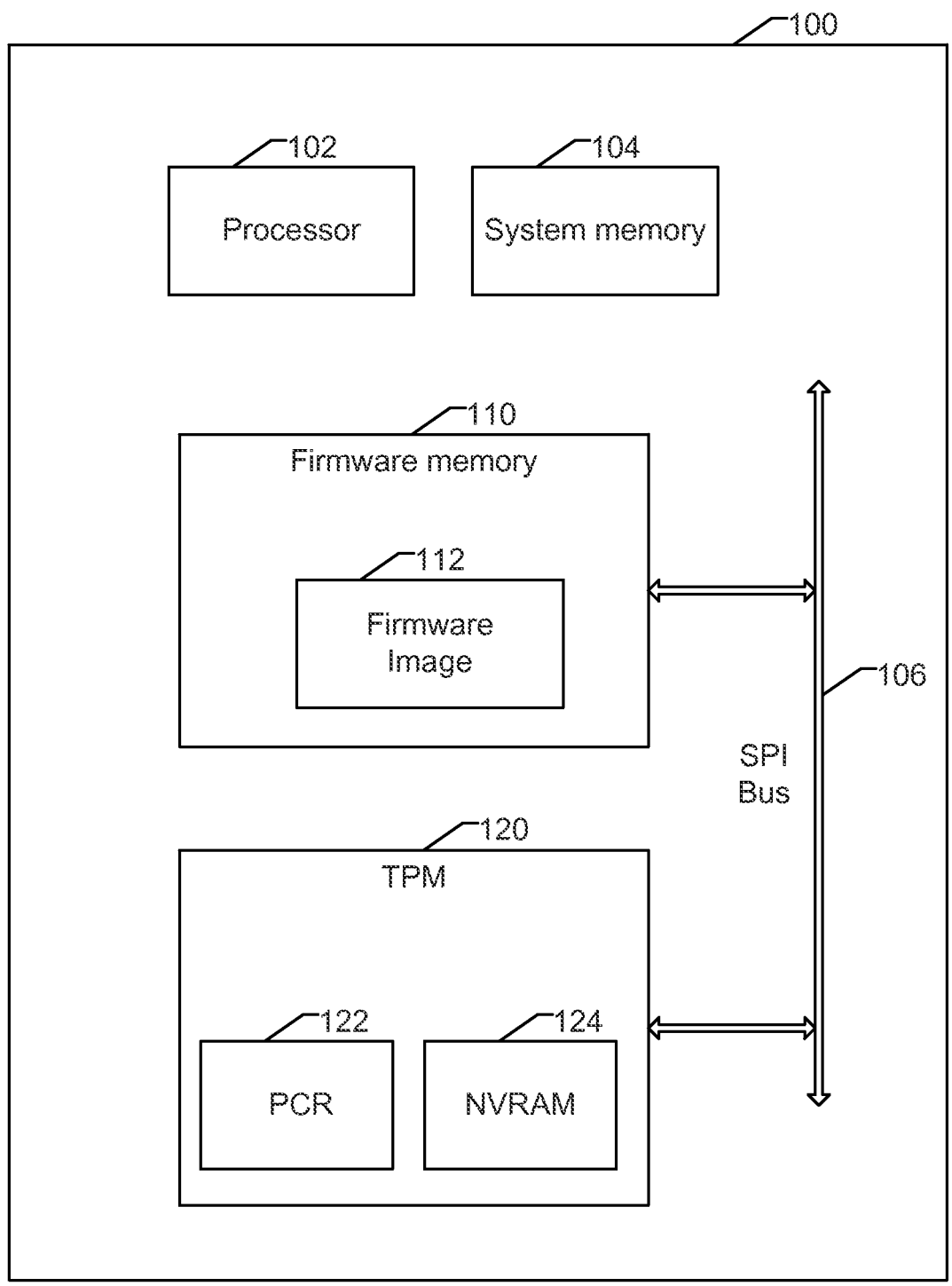
FIG. 1 is a block diagram illustrating an information handling according to a specific embodiment of the present disclosure.

FIG. 1 shows an information handling system 100 including a processor 102, system memory 104, a Serial Peripheral Interface (SPI) bus 106, a firmware memory 110, and a trusted platform man module (TPM) 120. Firmware memory 110 can include a non-volatile random access memory (NVRAM), and is configured to store a firmware image 112. Firmware image 112 is historically referred to as a basic input/output system (BIOS), and the term. BIOS is herein used interchangeably with the term firmware image. Firmware image 112 generally includes a collection of firmware routines, device drivers, and other software programs, and is further described below. TPM 120 includes platform configuration registers (PCR) 122 and secure storage NVRAM 124. The information handling system can include additional hardware components and additional buses operable to transmit information between the various hardware components. For example, information handling system 100 can include one or more network interface controllers, peripheral component controllers and interconnects, video display controllers, and the like. The information handling system 100 can further include a service processor, such as the Baseband Management Controller (not shown at FIG. 1) to enable remote monitoring and management of aspects of the information handling system 100, SPI bus 106 is a synchronous serial data link that operates in full duplex mode. It is used for short distance, single master communication, for example in embedded systems, sensors, and SD cards. Devices communicate over the SPI bus in master/stave mode where the master device initiates the data frame. While SPI bus 106 is illustrated at FIG. 1, another bus technology can be used to communicate with TPM 120 and/or firmware memory 110.

In a specific embodiment of the present disclosure, the firmware image 110 is encrypted before storing the image in firmware memory 110. The firmware image 112 is encrypted using a random symmetric encryption key generated by a software routine included in the firmware image 112. The encryption key can be stored in NVRAM 124 of TPM 120. The key is sealed to a TPM PCR state corresponding to a boot phase at the time of storing the key, such as during an early stage of execution of Unified Extensible Firmware Interface (UEFI) compliant boot software. During subsequent booting of information handling system 100, the encrypted firmware image 112 is retrieved from firmware memory 110, the symmetric key is unsealed from TPM 120, and the encrypted firmware image 112 is decrypted using the symmetric key. The unencrypted firmware image can be copied to system memory 104 where execution of the boot code included the image can commence.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Firmware image 112 is configured to initialize and test the system hardware components, and to load a boot loader or an operating system (OS) from a mass memory device. Firmware image 112 additionally provides an abstraction layer for the hardware, i.e. a consistent way for application programs and operating systems to interact with the keyboard, display, and other input/output devices. Variations in the system hardware are hidden by the BIOS from programs that use BIOS services instead of directly accessing the hardware. When power is first applied to information handling system 100, the system begins a sequence of initialization procedures during which components of the system are configured and enabled for operation. During the initialization sequence, also referred to as a boot sequence, device drivers associated with devices included at the system 100 can be installed. Device drivers provide an interface through which other components of the system 100 can communicate with a corresponding device.

In an embodiment, the firmware image 112 at the information handling system 100 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UM specification provides a standardized architecture and data structures to manage initialization and configuration of devices, booting of platform resources, and passing of control to the operating system. The UEFI specification alto for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having configurable firmware and one or more firmware images 112.

The firmware image 112 can be stored in firmware memory 110. A particular firmware image is typically assigned a revision number identifying the collection of firmware routines included in the firmware image. An original equipment manufacturer (OEM) can provide updates to firmware image 112 that include improvements, corrections to address errata, and other revisions. These updates typically constitute a complete firmware image having a new revision number. A firmware update operation can include replacing the current instructions stored at firmware memory 110 with new instructions. The update process can be initiated by executing a software program provided by the OEM. In one embodiment, the software program is executed when information handling system 100 is under the control of an OS. For example, a BIOS update program can download a new firmware image and store the image in system memory 104. During a subsequent reboot at the information handling system 100, the previously existing firmware image can be erased and the updated firmware image can be stored at firmware memory 110.

TPM 120 is compliant with an international standard for a secure cryptoprocessor. TPM 120 can include a dedicated microprocessor designed to secure hardware by integrating cryptographic keys into devices. The TPM technical specification was written by a computer industry consortium called the Trusted Computing Group (TCG). A TPM, such as TPM 120, can include a microchip designed to provide basic security-related functions, primarily involving encryption keys. The TPM is usually installed on the motherboard of a computer, such as information handling system 100, and communicates with the rest of the system by using a hardware bus, such as SPI bus 106. TPM 120 can create cryptographic keys and encrypt them so that they can only be decrypted by TPM 120. This process, often called "wrapping" or "binding" a key, can help protect the key from disclosure. TPM 120 can provide a master "wrapping" key, called the storage root key, which is stored within the TPM itself. The private portion of a key created at TPM 120 is never exposed to any other component, software, process, or person. TPM 120 can also create a key that has not only been wrapped but is also tied to certain platform measurements. This type of key can only be unwrapped when those platform measurements have the same values that they had when the key was created. This process is called "sealing" the key to the TPM. Decrypting the key is called "unsealing." TPM 120 can also seal and unseal data generated outside of the TPM. With this sealed key and software such as BitLocker Drive Encryption, data can be locked until specific hardware or software conditions are met. Private portions of key pairs are kept separate from the memory controlled by the operating system. Keys can be sealed to the TPM, and certain assurances about the state of a system can be made before the keys are unsealed and released for use.

During the boot process, TPM 120 can measure (hash) all the critical software and firmware components, including the BIOS, boot loader, and operating system kernel, before they are loaded. By making these measurements before the software runs and storing them on TPM 120, the measurements are isolated and secure from subsequent modification attempts. Measurements can be of code, data structures, configuration, information, or anything that can be loaded into memory. The TCG requires that code not be executed until after it has been measured. To further protect the integrity of the measurements, hash measurements are not directly written to PCRs, but rather a PCR is "extended" with a measurement. This means that the TPM takes the current value of the PCR and the measurement to be extended, hashes them together, and replaces the content of the PCR with that hash result. The effect is that the only way to arrive at a particular measurement in a PCR is to extend exactly the same measurements in exactly the same order. Therefore, if any module being measured has been modified, the resulting PCR measurement will be different and thus it is easy to detect if any code, configuration, data, etc. that has been measured had been altered or corrupted. A TPM_Extend command adds a new measurement to a PCR.

Figure 2:
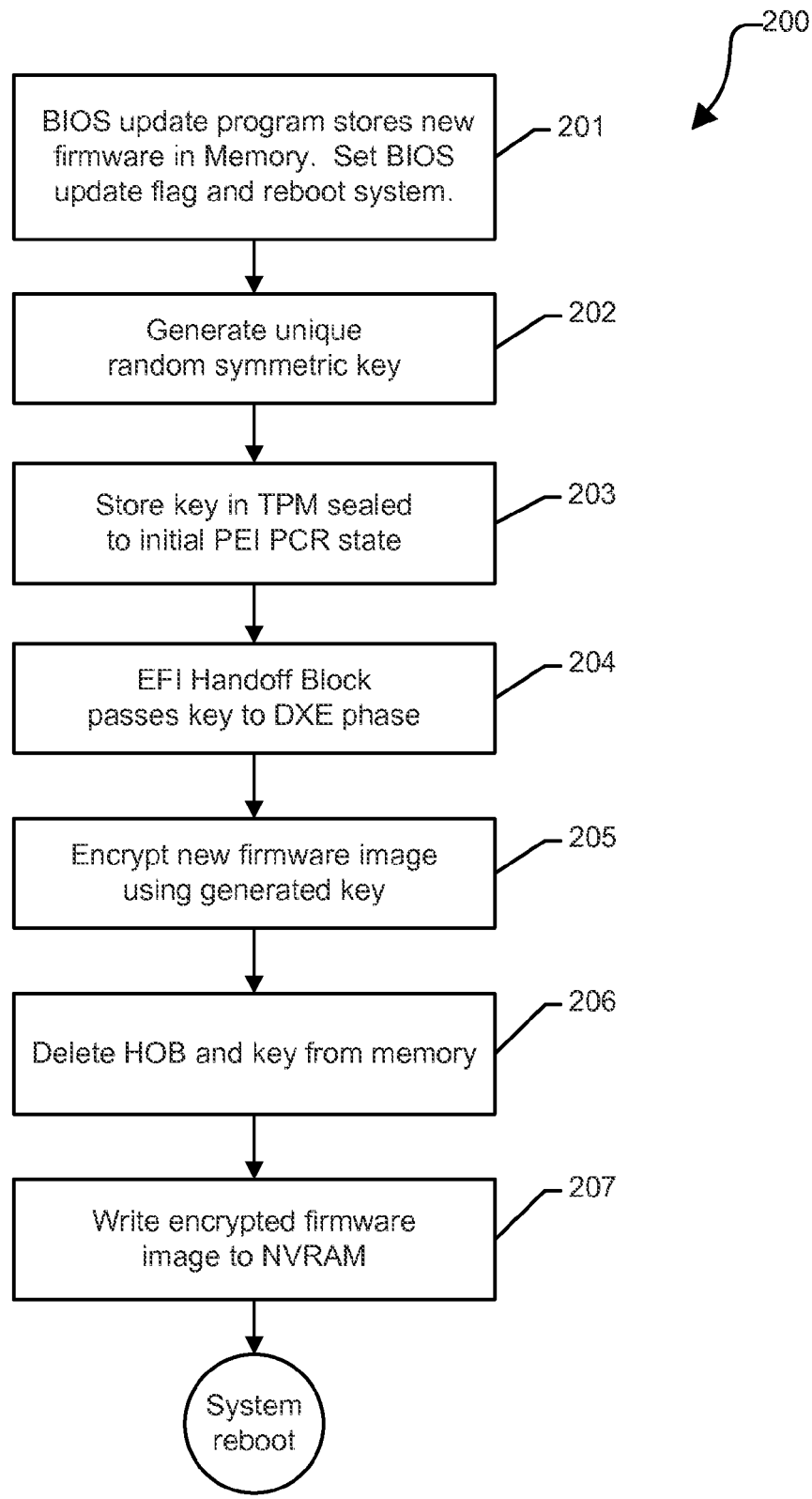
FIG. 2 is a flow diagram illustrating a method for encrypting a firmware image at the information handling system of FIG. 1 according to a specific embodiment of the present disclosure.

FIG. 2 is a flow diagram inns rating a method 200 for encrypting a firmware image at the information handling system of FIG. 1 according to a specific embodiment of the present disclosure. The method 200 begins at block 201 where a BIOS update program stores anew firmware image in a memory. A BIOS update flag is set, and a re-boot of the information handling system is initialized. For example, information handling system 100 can include a software program configured to determine whether an updated version of the system BIOS is available for this particular system. In one embodiment, the update program can be provided after the primary operating system as been loaded. A user of system 100 can execute the update program, which can check whether a firmware update applicable to this system exists at an Internet resource, such as at an OEM website. If an updated firmware image is available, the image can be downloaded and stored in a memory device, such as system memory 104. A BIOS update flag is set, which causes the updated BIOS image to be processed when system 100 is subsequently re-booted.

Method 200 continues at block 202 where a unique random symmetric key is generated. For example, early in the boot sequence following initiation of the reboot at block 201, such as during the early pre-EFI (PEI) phase, intrinsic BIOS code included the original firmware image can check to see whether the BIOS update flag is asserted. Since the flag has been asserted, the intrinsic BIOS code generates a symmetric key that will be used to encrypt, and later decrypt, the new firmware image. The method continues at block 203 where the symmetric key is stored at a TPM, the key sealed to the current TPM PCR state. For example, early in the PEI phase, TPM 120 can perform a measurement, and store the measurement at a register of PCR 122 using a TPM_Extend command. At a future time, the key can only be extracted from TPM 120 and unsealed if system 100 is at the same PCR state.

The method continues at block 204 where the EFI hand-off block passes the symmetric key to the Driver Execution Environment (DXE) phase. A hand-off block (HOB) is a binary data structure that passes system state information from the HOB producer phase to the HOB consumer phase in the UEFI Framework architecture. HOBs are used to hand off system information in the early pre-boot stages. For example, the UEFI Framework can use an BOB to pass information from the PEI phase to the DXE phase. The method continues at block 205 where the new firmware image is encrypted using the symmetric key generated at block 202. For example, processor 102 can retrieve the new firmware image from system memory 104, encrypt the image using the symmetric key, and store the encrypted image at system memory 104. One of skill will appreciate that a portion of the new firmware image is not encrypted. In particular, intrinsic BIOS code responsible for initializing TPM 120 and system memory 104, decrypting the remaining firmware image, and the like, is not encrypted and is thereby executable during the early stages of the PEI phase of the boot sequence. In one embodiment, the portion of the new firmware image that is encrypted corresponds substantially to instructions executed during the DXE phase of the boot sequence. The method continues at block 206 where the BOB and symmetric key are deleted from memory. The method continues at block 207 where the encrypted firmware image is stored at firmware memory 110. When information handling system 100 is once again re-booted, the updated firmware stored at firmware memory 110 will be decrypted and executed, as described below with reference to FIG. 3.

Figure 3:
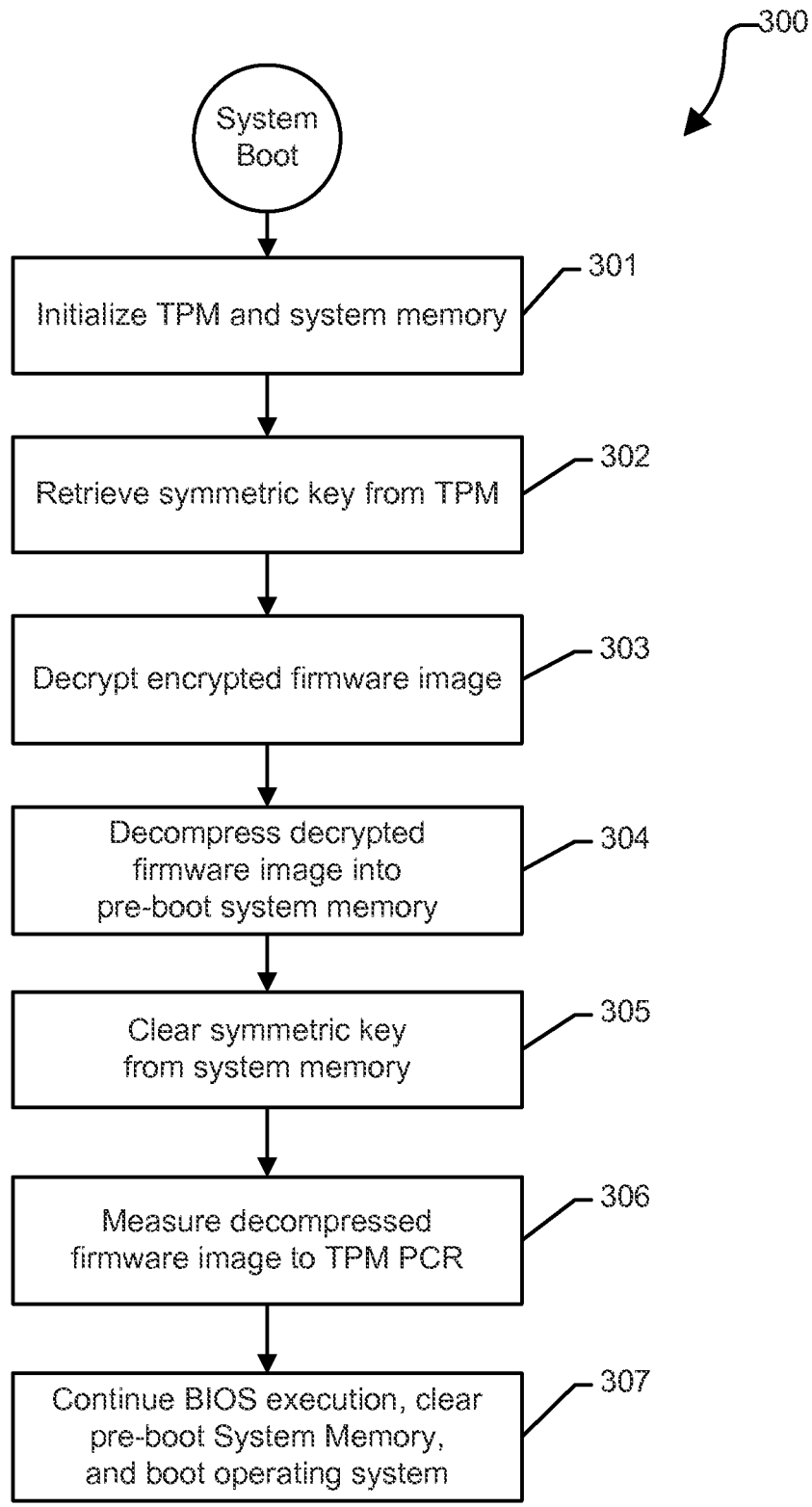
FIG. 3 is a flow diagram illustrating a method for executing an encrypted firmware image at the information handling system of FIG. 1 according to another embodiment of the present disclosure.

FIG. 3 is a flow diagram illustrating a method 300 for executing an encrypted firmware image at the information handling system of FIG. 1 according to another embodiment of the present disclosure. Method 300 begins at block 301 where a TPM and system memory is initialized during a re-boot of an information handling system. For example, early in the PEI boot stage of information handling system 100, system resources such TPM 120 and system memory 104 are initialized for operation. The method continues at block 302, where the symmetric key is retrieved from the TPM 120. As described above, retrieval and unsealing of the symmetric key from TPM 120 requires that state measurements at the present time match the PCR state at the time that the key was originally stored at TPM 120. The method continues at block 303 where the encrypted firmware image is retrieved from firmware memory and decrypted using the symmetric key. For example, processor 102 of information handling system 100 can retrieve the encrypted firmware image from firmware memory 110 and decrypt the image using the symmetric key.

At block 304, the decrypted image can be decompressed and stored at the system memory. The flow continues at block 305 where the symmetric key is cleared from system memory. Accordingly, a rogue program or unauthorized individual cannot access and decrypt the contents of firmware memory 110 without access to the symmetric key. The method continues at block 306 where the decompressed firmware image is measured and appended to a TPM PCR. For example, during a subsequent boot of information handling system 100, successful booting of system 100 requires that a measurement of the current state during the boot process must match the state recorded at the TPM PCR 122. If the present PCR state does not match the state at the time the new firmware image was measured, further booting of information handling system 100 is disabled. If, however, the present PCR state matches the state at the time the new firmware image was measured, the method continues at block 307 where BIOS execution continues, pre-boot system memory is cleared, and the operating system is initialized.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving an unencrypted firmware image at system memory at an information handling system;
generating a symmetric key;
storing the symmetric key at a trusted platform module (TPM);
encrypting a first portion of the unencrypted firmware image using the symmetric key to provide an encrypted firmware image the first portion including instructions executed during a Driver Execution Environment (DXE) phase of a platform innovation framework for extensible firmware interface (EFI) boot sequence; and
storing the encrypted firmware image in a non-volatile memory.

2. The method of claim 1, further comprising storing the symmetric key sealed to a first TPM platform configuration register (PCR) state corresponding to a pre-extensible firmware interface (PEI) phase of the platform innovation framework for EFI boot sequence.

3. The method of claim 1, further comprising storing the symmetric key during a pre-extensible firmware interface (PEI) phase of the platform innovation framework for EFI boot sequence.

4. The method of claim 1, wherein a second portion of the encrypted firmware image that is to be executed during a pre-extensible firmware interface (PEI) phase of the platform innovation framework for EFI boot sequence is not encrypted.

5. The method of claim 1, further comprising initiating a system boot at the information handling system after receiving the unencrypted firmware image and before generating the symmetric key.

6. The method of claim 1, wherein receiving the firmware image further comprises:
storing the unencrypted firmware image at a system memory;
setting a firmware update flag;
initiating a boot process at the information handling system; and
determining the firmware update flag is set.

7. The method of claim 1, further comprising encrypting the unencrypted firmware image during the DXE phase of the platform innovation framework for EFI boot sequence.

8. The method of claim 1, wherein generating the symmetric key further comprises:
storing the symmetric key at a system memory; and
deleting the symmetric key from the system memory after encrypting the firmware image.

9. The method of claim 1, further comprising:
retrieving the symmetric key from the TPM;
retrieving the encrypted firmware image from the non-volatile memory; and
decrypting the first portion of the encrypted firmware image using the symmetric key.

10. The method of claim 9, wherein retrieving the symmetric key further comprises un-sealing the symmetric key at the TPM based on a current TPM platform configuration register (PCR) state corresponding to a pre-extensible firmware interface (PEI) phase of the platform innovation framework for EFI boot sequence.

11. A method comprising:
  initializing a trusted platform module (TPM) and system memory at an information handling system;
  retrieving a symmetric key from the TPM during a pre-extensible firmware interface (PEI) phase of a platform innovation framework for extensible firmware interface (EFI) boot sequence;
  retrieving an encrypted firmware image from a non-volatile memory, wherein a first portion of the encrypted firmware image that includes instructions executed during a Driver Execution Environment (DXE) phase of the platform innovation framework for EFI boot sequence is encrypted, and wherein a second portion of the encrypted firmware image that is to be executed during a pre-extensible firmware interface (PEI) phase of the platform innovation framework for EFI boot sequence is not encrypted;
  decrypting the first portion of the encrypted firmware image using the symmetric key to provide a decrypted firmware image;
  decompressing the decrypted firmware image;
  measuring the decompressed firmware image to a TPM platform configuration register (PCR) during the PEI phase of the platform innovation framework for EFI boot sequence; and
  executing the decompressed firmware image to complete booting of the information handling system.

12. The method of claim 11, wherein retrieving the symmetric key further comprises un-sealing the symmetric key based on a current PCR state corresponding to the PEI phase of the platform innovation framework for EFI boot sequence.

13. The method of claim 11, wherein retrieving the symmetric key further comprises:
  storing the symmetric key in a system memory; and
  clearing the symmetric key from the system memory after the decrypting.

14. An information handling system comprising:
  a trusted platform module (TPM)
  a system memory;
  a non-volatile memory; and
  a processor coupled to the TPM and the non-volatile memory, the processor configured to execute instructions to:
    receive an unencrypted firmware image at the information handling system;
    generate a symmetric key;
    store the symmetric key at the TPM;
    encrypt a first portion of the unencrypted firmware image using the symmetric key to provide an encrypted firmware image, wherein the first portion includes instructions executed during a Driver Execution Environment (DXE) phase of a platform innovation framework for extensible firmware interface (EFI) boot sequence, and a second portion of the encrypted firmware image that is to be executed during a pre-extensible firmware interface (PEI) phase of the platform innovation framework for EFI boot sequence is not encrypted; and
    store the encrypted firmware image in the non-volatile memory.

15. The information handling system of claim 14, wherein the processor is further to store the symmetric key sealed to a first TPM platform configuration register (PCR) state corresponding to the PEI phase of the platform innovation framework for EFI boot sequence.

16. The information handling system of claim 14, wherein the processor is further to store the symmetric key during the PEI phase of the platform innovation framework for EFI boot sequence.

17. The information handling system of claim 14, wherein the processor is further to initiate a system boot at the information handling system after receiving the unencrypted firmware image and before generating the symmetric key.

18. The information handling system of claim 14, wherein the processor is further to encrypt the unencrypted firmware image during the DXE phase of the platform innovation framework for EFI boot sequence.

19. The information handling system of claim 14, wherein the processor is further to:
  retrieve the symmetric key from the TPM;
  retrieve the encrypted firmware image from the non-volatile memory; and
  decrypt the first portion of the encrypted firmware image using the symmetric key.

20. The information handling system of claim 19, wherein retrieving the symmetric key further comprises un-sealing the symmetric key at the TPM based on a current TPM platform configuration register (PCR) state corresponding to the PEI phase of the platform innovation framework for EFI boot sequence.

* * * * *